US012812487B2

(12) United States Patent
Wang et al.

(10) Patent No.: US 12,812,487 B2

(45) Date of Patent: Nov. 24, 2026

(54) COMMUNICATION METHOD, COMMUNICATION APPARATUS, AND COMPUTER STORAGE MEDIUM

(71) Applicant: HUAWEI TECHNOLOGIES CO., LTD., Shenzhen (CN)

(72) Inventors: Rui Wang, Shanghai (CN); Lin Sun, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 287 days.

(21) Appl. No.: 18/639,000

(22) Filed: Apr. 18, 2024

(65) Prior Publication Data

US 2024/0267810 A1 Aug. 8, 2024

Related U.S. Application Data

(63) Continuation of application No. PCT/CN2022/125828, filed on Oct. 18, 2022.

(30) Foreign Application Priority Data

Oct. 19, 2021 (CN) ......................... 202111217406.1

(51) Int. Cl.
*H04W 36/08* (2009.01)
*H04W 36/00* (2009.01)

(52) U.S. Cl.
CPC ....... *H04W 36/08* (2013.01); *H04W 36/0085* (2018.08)

(58) Field of Classification Search
CPC ............. H04W 36/08; H04W 36/0085; H04W 36/0022; H04W 88/06; H04W 48/18; H04W 76/27; H04W 68/00
See application file for complete search history.

(56) References Cited

U.S. PATENT DOCUMENTS 12,621,801 B2 * 5/2026 Hong .................. H04W 68/005
2015/0282237 A1 * 10/2015 Su ......................... H04W 76/16 455/552.1

(Continued)

FOREIGN PATENT DOCUMENTS

CN 112888043 A 6/2021
WO WO-2022211591 A1 * 10/2022 ............ H04W 88/06

OTHER PUBLICATIONS

Samsung, SK Telecom: "23.502: EPS fallback when UE is in CM-IDLE." SA WG2 Meeting#S2-124, Nov. 27-Dec. 1, 2017, Reno, Nevada, USA. S2-178687, total 2 pages. (Year: 2017).*

(Continued)

*Primary Examiner* — Angelica Perez

(74) *Attorney, Agent, or Firm* — HAUPTMAN HAM, LLP

(57) ABSTRACT

A first access network device obtains voice service indication information and sends a first paging message including the voice service indication information to a first terminal. The first access network device receives, from the first terminal, a request message is usable to request to establish or resume an RRC connection. The request message includes indication information usable to indicate that the RRC connection is established or resumed based on a voice service. The first access network device determines, based on the indication information, to enable the first terminal to access a second access network. The first access network device is located in a first access network using a first radio access technology. The second access network uses a second radio access technology, and the second access network supports the first terminal in performing the voice service to reduce communication delay and improve communication quality.

18 Claims, 6 Drawing Sheets

(56) References Cited

U.S. PATENT DOCUMENTS

| | | | | |
|---|---|---|---|---|
| 2020/0029300 | A1* | 1/2020 | Du | H04W 68/005 |
| 2020/0314798 | A1* | 10/2020 | Fujishiro | H04W 52/02 |
| 2021/0160808 | A1* | 5/2021 | Yang | H04W 8/02 |
| 2022/0116910 | A1* | 4/2022 | Liu | H04W 48/18 |
| 2022/0210632 | A1* | 6/2022 | Tseng | H04W 8/183 |
| 2024/0323913 | A1* | 9/2024 | Youn | H04L 65/1073 |

OTHER PUBLICATIONS

Vivo, China Telecom et al: "Reduce the blind redirection for EPS Fallback." 3GPP TSG RAN WG2#115-e, e-Meeting, Aug. 16-Aug. 20, 2021. R2-2108670, total 7 pages. (Year: 2021).*

3rd Generation Partnership Project; Technical Specification Group Services and System Aspects; Procedures for the 5G System (5GS); Stage 2 (Release 17). 3GPP TS 23.502 V17.2.1 (Sep. 2021). total 705 pages.

3rd Generation Partnership Project; Technical Specification Group Radio Access Network; NR; Radio Resource Control (RRC) protocol specification (Release 16). 3GPP TS 38.331 V16.6.0 (Sep. 2021). total 965 pages.

International Search Report issued in corresponding International Application No. PCT/CN2022/125828, dated Dec. 15, 2022, pp. 1-9.

Samsung, SK Telecom:"23.502: EPS fallback when UE is in CM-IDLE." SA WG2 Meeting#S2-124, Nov. 27-Dec. 1, 2017, Reno, Nevada, USA. S2-178687, total 2 pages.

LG Uplus:"Remaining issue on EPS voice fallback enhancement." 3GPP TSG-RAN WG2#110-e, E-Meeting, Jun. 1-12, 2020. R2-2004447, total 3 pages.

Vivo, China Telecom et al:"Reduce the blind redirection for EPS Fallback." 3GPP TSG RAN WG2#115-e, e-Meeting, Aug. 16-Aug. 20, 2021. R2-2108670, total 7 pages.

Extended European Search Report issued in corresponding European Application No. 22882829.9, dated Dec. 5, 2024, pp. 1-14.

* cited by examiner

COMMUNICATION METHOD, COMMUNICATION APPARATUS, AND COMPUTER STORAGE MEDIUM

CROSS-REFERENCE TO RELATED APPLICATIONS

This application is a continuation of International Application No. PCT/CN2022/125828, filed on Oct. 18, 2022, which claims priority to Chinese Patent Application No. 202111217406.1, filed on Oct. 19, 2021. The disclosures of the aforementioned applications are hereby incorporated by reference in their entireties.

BACKGROUND

In a new radio (NR) communication system, after a terminal enters a connected state, in response to the terminal performing a voice service, an NR base station triggers the terminal to be handed over or redirected to a long term evolution (LTE) cell, so that the terminal performs a voice service using an LTE cell. This process is referred to as evolved packet system fallback (EPS fallback).

However, the foregoing EPS fallback process is applicable only to a terminal in a connected state. In response to the terminal being in an idle state or an inactive state, the terminal performs the EPS fallback process only after entering the connected state. Therefore, an overall delay is long, and communication quality of the terminal is affected.

SUMMARY

Embodiments described herein provide a communication method, a communication apparatus, and a computer storage medium, to improve communication quality of a voice service.

According to a first aspect, at least one embodiment provides a communication method, including: A first access network device obtains voice service indication information. The first access network device sends a first paging message to a first terminal, where the first paging message includes the voice service indication information, the first access network device is located in a first access network using a first radio access technology. The first access network device receives a request message from the first terminal, where the request message is used to request to establish or resume a radio resource control (RRC) connection, the request message includes indication information, and the indication information indicates that the RRC connection is established or resumed based on a voice service. The first access network device determines, based on the indication information, to enable the first terminal to access a second access network using a second radio access technology, where the second access network supports the first terminal in performing the voice service.

Optionally, the first terminal is in a non-connected state, including a third state or an idle state.

In at least one embodiment of the first aspect, that the first access network device determines, based on the indication information, to enable the first terminal to access a second access network using a second radio access technology includes: The first access network device determines, based on the indication information, to hand over or redirect the first terminal to a second access network device, where the second access network device is located in the second access network.

In at least one embodiment of the first aspect, that the first access network device determines, based on the indication information, to enable the first terminal to access a second access network using a second radio access technology includes: The first access network device configures a measurement parameter for the first terminal based on the indication information, where the measurement parameter is used to measure a cell managed by one or more access network devices in the second access network.

In at least one embodiment of the first aspect, that the first access network device determines, based on the indication information, to enable the first terminal to access a second access network using a second radio access technology includes: The first access network device determines a target base station or a target cell in the second access network for the first terminal based on the indication information. The method further includes: The first access network device sends, to the first terminal, indication information indicating the target base station or the target cell.

In at least one embodiment of the first aspect, that a first access network device obtains voice service indication information includes: The first access network device receives a second paging message from a core network, where the second paging message includes the voice service indication information, and the core network and the first access network device use a same radio access technology.

In at least one embodiment of the first aspect, that a first access network device obtains voice service indication information includes: The first access network device receives, from a core network, downlink data transmitted to the first terminal or signaling related to the first terminal, where the downlink data or the signaling is related to the voice service. The first access network device determines the voice service indication information based on the downlink data or the signaling, where the core network and the first access network device use a same radio access technology. In this implementation, the first terminal is in a third state. Optionally, the method further includes: The first access network device sends a second paging message to a neighboring access network device, where the second paging message includes the voice service indication information.

According to a second aspect, at least one embodiment provides a communication method, including: A first terminal receives a first paging message from a first access network device, where the first paging message includes voice service indication information, and the first access network device is located in a first access network using a first radio access technology. The first terminal sends a request message to the first access network device, where the request message is used to request to establish or resume an RRC connection, the request message includes indication information, and the indication information indicates that the RRC connection is established or resumed based on a voice service.

In at least one embodiment of the second aspect, the voice service indication information is determined based on a second paging message received by the first access network device from a core network, the second paging message includes the voice service indication information, and the core network and the first access network device use a same radio access technology.

In at least one embodiment of the second aspect, the voice service indication information is determined based on downlink data or signaling related to the first terminal that is received by the first access network device from a core network, the downlink data is transmitted to the first terminal, the downlink data or the signaling is related to the voice service, and the core network and the first access network device use a same radio access technology.

In at least one embodiment of the second aspect, the method further includes: An access stratum of the first terminal ignores an RRC connection establishment cause value or an RRC connection resume cause value provided by a non-access stratum of the terminal, and uses the indication information as the RRC connection establishment cause value or the RRC connection resume cause value.

In at least one embodiment of the second aspect, the method further includes: The first terminal receives a measurement parameter from the first access network device, where the measurement parameter is used to measure a cell managed by one or more access network devices in a second access network.

In at least one embodiment of the second aspect, the method further includes: The first terminal receives, from the first access network device, indication information indicating a target base station or a target cell located in the second access network.

The second access network uses a second radio access technology, and supports the first terminal in performing the voice service. The terminal accesses the second access network to perform the voice service.

In at least one embodiment of the first aspect or the second aspect, the first paging message further includes an identifier of one or more terminals, an identifier of the first terminal corresponds to the voice service indication information, and the first terminal belongs to the one or more terminals.

In at least one embodiment of the first aspect or the second aspect, the first access network is a new radio network, and the second access network is a long term evolution network.

In at least one embodiment of the first aspect or the second aspect, the core network is a 5G core network.

According to the communication method according to the first aspect or the second aspect, the terminal sends, to the access network device, an RRC connection establishment/resume request message including a voice service cause value, so that the access network device learns that the terminal is to perform the voice service. In response to the access network device not supporting the voice service, the access network device determines to enable the terminal to access another target access network that supports the voice service, and perform measurement configuration for the terminal or determine a candidate access network device/cell/frequency in the target access network for the terminal, and the access network device sends the measurement configuration to the terminal or indicate the terminal to access the target access network without waiting for a quality of service flow (QOS flow) establishment request sent by the core network, so that the terminal performs the voice service in the target access network in time, thereby reducing a delay of performing the voice service by the terminal, and improving communication quality.

According to a third aspect, at least one embodiment provides a communication method, including: A first terminal receives a first paging message from a first access network device, where the first paging message includes first indication information, and the first indication information indicates the first terminal to access a second access network. The first terminal determines a target cell in the second access network based on the first indication information. The first terminal accesses a second access network device, where the first access network device is located in a first access network using a first radio access technology, the second access network uses a second radio access technology, and the second access network supports the first terminal in performing a voice service.

In at least one embodiment of the third aspect, the first indication information is determined based on a second paging message received by the first access network device from a core network, the second paging message includes voice service indication information, and the core network and the first access network device use a same radio access technology.

In at least one embodiment of the third aspect, the first indication information is determined based on downlink data or signaling related to the first terminal that is received by the first access network device from a core network, the downlink data is transmitted to the first terminal, the downlink data or the signaling is related to the voice service, and the core network and the first access network device use a same radio access technology.

In at least one embodiment of the third aspect, that the first terminal accesses a second access network device includes: The first terminal sends an RRC connection establishment request message to the second access network device to which the target cell belongs. Optionally, the RRC connection establishment request message includes second indication information, and the second indication information indicates that an RRC connection is established based on the voice service. Optionally, an access stratum of the first terminal ignores an RRC connection establishment cause value provided by a non-access stratum of the first terminal, and uses the second indication information as the RRC connection establishment cause value.

In at least one embodiment of the third aspect, the method further includes: receiving information about a candidate frequency or information about a candidate cell from the first access network device. Therefore, the first terminal selects the target cell from the candidate cell or from a cell corresponding to the candidate frequency for access.

In at least one embodiment of the third aspect, the method further includes: The first terminal receives third indication information from the first access network device, where the third indication information indicates that the first access network device does not support the voice service. The first terminal determines, based on the first indication information and the third indication information, to access the second access network device, where the first indication information is the voice service indication information. Optionally, the third indication information is included in system information broadcast by the first access network device.

According to a fourth aspect, at least one embodiment provides a communication method, including: A first access network device determines a first paging message, where the first paging message includes first indication information, and the first indication information indicates a first terminal to access a second access network. The first access network device sends the first paging message to the first terminal, where the first paging message is used by the first terminal to determine to access a target cell in the second access network, the first access network device is located in a first access network using a first radio access technology, the second access network uses a second radio access technology, and the second access network supports the first terminal in performing a voice service.

In at least one embodiment of the fourth aspect, that a first access network device determines a first paging message includes: The first access network device receives a second paging message from a core network, where the second paging message includes voice service indication information. The first access network device determines the first paging message based on the second paging message, where the core network and the first access network device use a same radio access technology.

In at least one embodiment of the fourth aspect, that a first access network device determines a first paging message includes: The first access network device receives downlink data or signaling related to the first terminal from a core network, where the downlink data is transmitted to the first terminal, and the downlink data or the signaling is related to the voice service. The first access network device determines the first paging message based on the downlink data or the signaling, where the core network and the first access network device use a same radio access technology.

In at least one embodiment of the fourth aspect, the method further includes: The first access network device sends information about a candidate frequency or information about a candidate cell to the first terminal. Optionally, the information about the candidate frequency or the information about the candidate cell is sent by using system information or an RRC connection release message.

In at least one embodiment of the fourth aspect, the method further includes: The first access network device sends third indication information to the first terminal, where the third indication information indicates that the first access network device does not support the voice service. Optionally, the third indication information is included in system information broadcast by the first access network device.

In at least one embodiment of the third aspect or the fourth aspect, the first indication information is the voice service indication information, or the first paging message further includes the voice service indication information.

In at least one embodiment of the third aspect or the fourth aspect, the first paging message further includes an identifier of one or more terminals, an identifier of the first terminal corresponds to the voice service indication information, and the first terminal belongs to the one or more terminals.

In at least one embodiment of the third aspect or the fourth aspect, the first access network is a new radio network, and the second access network is a long term evolution network.

In at least one embodiment of the third aspect or the fourth aspect, the core network is a 5G core network.

According to the communication method according to the third aspect or the fourth aspect, after receiving, from a currently camped access network device, a paging message including the voice service indication information, the terminal learns that the access network device indicates the terminal to access a target access network that supports the terminal in performing the voice service. Therefore, the terminal directly initiates an access process to a base station in the target access network without accessing the camped access network device or registering with the core network connected to the camped access network device, so that the terminal performs the voice service in the target access network in time, thereby reducing a delay of performing the voice service by the UE, and improving communication quality.

According to a fifth aspect, at least one embodiment further provides a communication apparatus, including a unit, a module, or a means (means) configured to perform the steps in the first aspect to the fourth aspect. The communication apparatus is a network device or an apparatus used in the network device. The network device is a base station or a device that has some functions of the base station.

According to a sixth aspect, at least one embodiment further provides a communication apparatus, including a processor and an interface circuit. The processor is configured to: communicate with another apparatus via the interface circuit, and perform the methods according to the first aspect to the fourth aspect. There are one or more processors.

According to a seventh aspect, at least one embodiment further provides a communication apparatus, including a processor, configured to invoke a program stored in a memory, to perform the methods according to the first aspect to the fourth aspect. The memory is located inside or outside the apparatus. In addition, there are one or more processors.

According to an eighth aspect, at least one embodiment further provides a computer program product. In response to a program being invoked by a processor, the method according to any one of the foregoing aspects is performed.

In addition, a computer-readable storage medium is provided, and includes the foregoing program.

According to a ninth aspect, at least one embodiment provides a communication system, including a first access network device and a second access network device. The first access network device is configured to perform the method according to the first aspect, or the first access network device is configured to perform the method according to the fourth aspect.

DESCRIPTION OF EMBODIMENTS

Technologies described in embodiments herein are applied to a plurality of communication systems such as a long term evolution (LTE) wireless communication system and a 5th generation (5G) mobile communication system, for example, a new radio (NR) system, or another next generation (NG) communication system or a new communication system. This is not limited in at least one embodiment.

In at least one embodiment, a terminal is various devices that provide voice and/or data connectivity for a user, or is referred to as a terminal device, user equipment (UE), a mobile station, a mobile terminal, or the like. The terminal is widely used in various scenarios, such as device-to-device (D2D), vehicle-to-everything (V2X) communication, machine-type communication (MTC), internet of things (IoT), virtual reality, augmented reality, industrial control, autonomous driving, remote medical, a smart grid, smart furniture, smart office, smart wearable, smart transportation, and a smart city. The terminal is a mobile phone, a tablet computer, a computer with a wireless transceiver function, a wearable device, an aerospace device, or the like. In at least one embodiment, a chip used in the foregoing device is also referred to as the terminal. The following uses UE as the terminal for description.

In at least one embodiment, a network device is an access network device such as a base station. For example, the network device is an evolved NodeB (eNodeB), a transmission reception point (TRP), a next generation NodeB (gNB) in a 5th generation (5G) mobile communication system, a next generation base station in a 6th generation (6G) mobile communication system, or a base station in a future mobile communication system: or is a module or a unit that completes some functions of the base station, for example, is a central unit (CU) or a distributed unit (DU). The CU herein completes functions of the radio resource control protocol and the packet data convergence protocol (PDCP) of the base station, and further completes functions of the service data adaptation protocol (SDAP). The DU completes functions of a radio link control layer and a medium access control (MAC) layer of the base station, and further completes functions of a part or all of a physical layer. For specific descriptions of the foregoing protocol layers, refer to technical specifications related to the 3rd generation partnership project (3GPP). The network device is a macro base station, a micro base station, an indoor base station, a relay node, a master node, or the like. A specific technology and a specific device form that are used by the network device are not limited in at least one embodiment. The following uses the base station as the network device for description.

Figure 1:
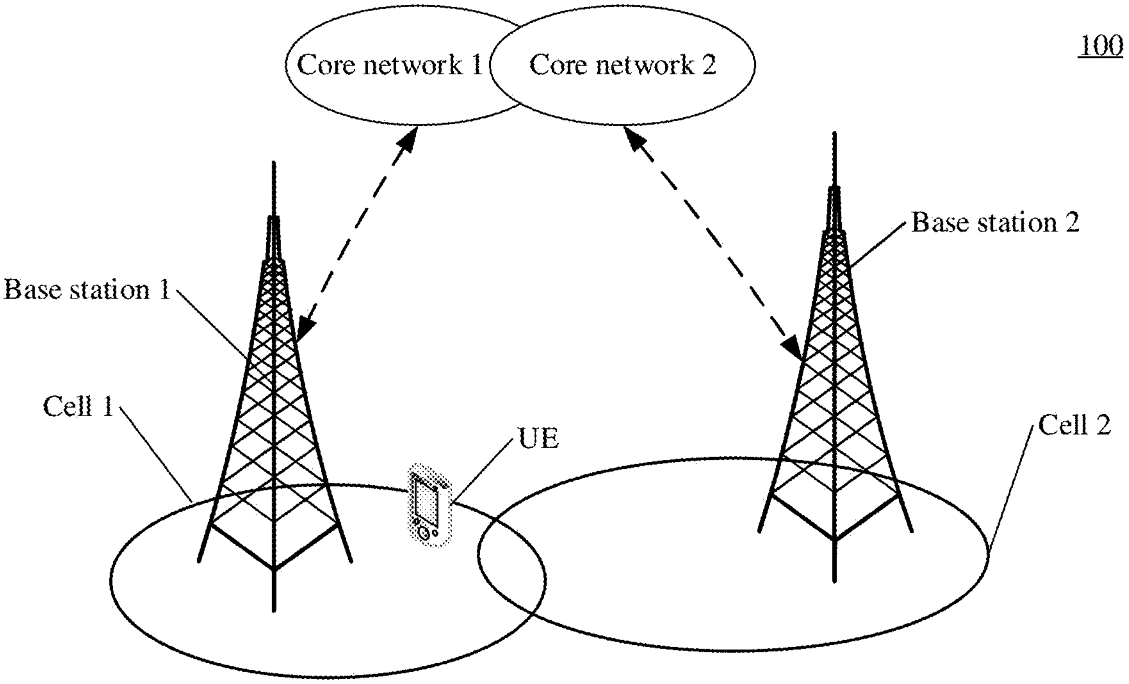
FIG. 1 is a diagram of an application scenario according to at least one embodiment.

FIG. 1 is a diagram of an application scenario according to at least one embodiment:

As shown in FIG. 1, a base station 1 and a base station 2 are base stations that use different radio access technologies (RAT), that is, the base station 1 and the base station 2 have different RATs. The base station 1 is connected to a core network 1, the base station 2 is connected to a core network 2, and the base station 1 and the base station 2 directly communicate with each other, or indirectly communicate with each other via another network device. Each base station manages one or more cells. A coverage area of each cell covers one or more terminals. The terminal accesses a network device by using the cell and obtains a communication service. In FIG. 1, the base station 1 manages a cell 1, the base station 2 manages a cell 2, and UE accesses the cell 1.

Figure 2:
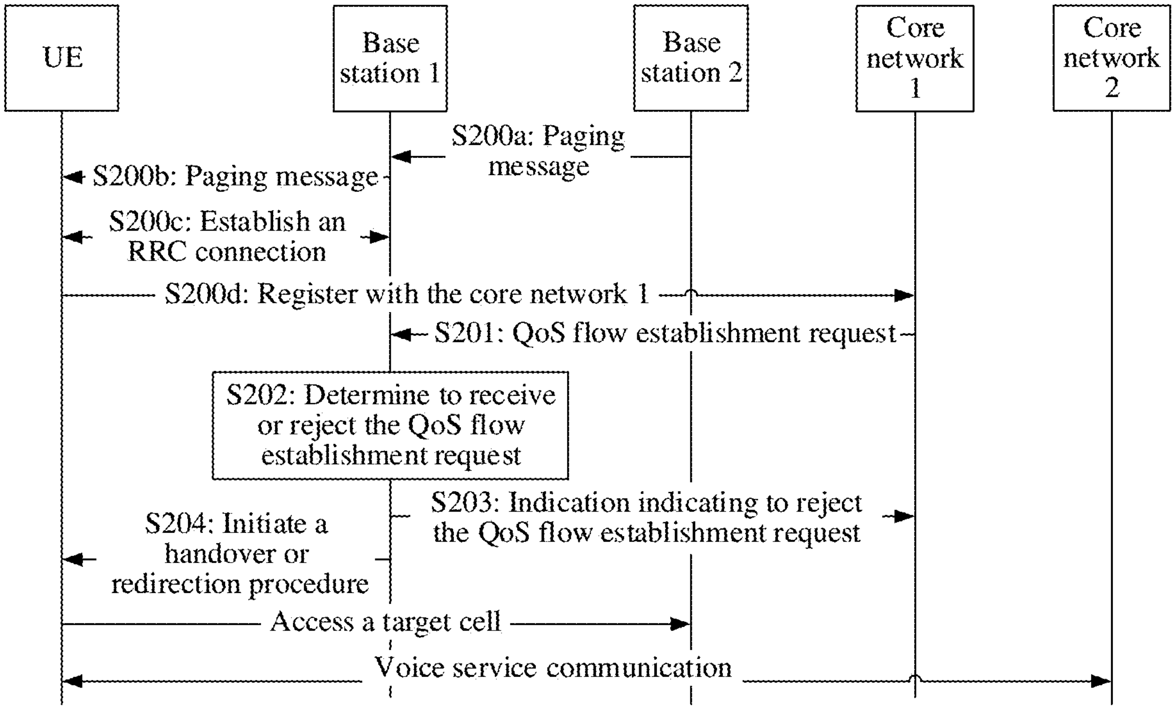
FIG. 2 is a schematic flowchart of EPS fallback according to at least one embodiment.

The base station 1 uses an NR radio access technology, that is, the base station 1 is an NR base station, and the core network 1 is a 5G core (5GC) network; and the base station 2 uses an LTE radio access technology, that is, the base station 2 is an LTE base station, and the core network 2 is an evolved packet core (EPC) network. The UE accesses the cell 1 to establish a connection to the 5GC. The 5GC provides a voice service for UE in a connected state through evolved packet system (EPS) fallback (fallback). An implementation of the EPS fallback is shown in FIG. 2.

S201: The core network 1 sends a QoS flow establishment request to the base station 1, where the QoS flow establishment request is used to request to establish a QoS flow used to transmit voice service data.

Specifically, in response to the UE performing calling/being called, the core network 1 identifies that the UE is to perform data transmission of a voice service; and initiates a session update request (PDU session modification) procedure, and send the QoS flow establishment request to the base station 1 in the procedure.

S202: The base station 1 determines to receive or reject the QoS flow establishment request.

Specifically, after receiving the QoS flow establishment request, the base station 1 determines, based on whether the base station 1 supports the voice service and some other known network factors such as a network deployment status, a core network capability, and an operator policy, to receive or reject the QoS flow establishment request.

In response to the base station 1 determining to reject the QoS establishment request, the base station 1 performs S203 and S204, to complete the EPS fallback.

S203: The base station 1 sends, to the core network 1, an indication indicating to reject the QoS flow establishment request.

S204: The base station 1 initiates a handover or redirection procedure to the UE, so that the UE accesses an LTE cell to perform the voice service.

The base station 1 determines that the UE is to be handed over or redirected to a cell managed by the base station 2, that is, the base station 2 is used as a target base station of handover or redirection, and the cell managed by the base station 2 is used as a target cell of handover or redirection.

In response to the base station 1 initiating a handover procedure, the base station 1 uses a handover command sent to the UE and a handover preparation request sent to the base station 2 to carry EPS fallback indication information, to indicate to hand over the UE to the cell of the base station 2. In response to the handover of the UE failing, the UE attempts to select an LTE cell for access, and performs RRC reestablishment in response to no proper LTE cell being found. In response to the UE accessing the LTE cell, an RRC connection establishment request message carries a cause value indicating that an RRC connection is established based on the voice service performed by the UE.

In response to the base station 1 initiating a redirection procedure, the base station 1 uses an RRC release message sent to the UE to carry EPS fallback indication information, to indicate to redirect the UE to the cell of the base station 2. Further, the UE sends an RRC connection establishment request to the cell of the base station 2, for example, the cell 2, where the RRC connection establishment request includes a cause value indicating that an RRC connection is established based on the voice service performed by the UE. After the UE is handed over or redirected to a target cell, for example, the cell 2, the UE completes a connection establishment process of the voice service with the core network 2, and transfers the voice service of the UE to an LTE network for processing.

The EPS fallback is implemented in response to the UE being in the connected state. In response to the UE being in a non-connected state, the UE falls back to the LTE cell based on the handover or redirection procedure to perform the voice service only after entering the connected state. As shown in FIG. 2, before S201, a process in which the UE enters the connected state includes S200*a* to S200*d*:

S200*a*: The core network 1 sends a paging message to the base station 1.

S200*b*: The base station 1 sends the paging message to the UE.

S200*c*: The UE establishes an RRC connection to the base station 1.

S200*d*: The UE registers with the core network 1.

In a registration process, the UE completes procedures such as security activation, and establishes, with the core network 1, a QoS flow for carrying control signaling of the voice service.

The control signaling is session initiation protocol (SIP) signaling, for example, signaling used for dialing ringing. The UE sends or receives the SIP signaling via a base station. Based on the SIP signaling, the UE performs calling by using an NR cell, for example, the cell 1, to initiate the voice service, or is called by using an NR cell.

Compared with the UE in the connected state, the UE in the non-connected state has a significantly longer delay of completing the EPS fallback, higher signaling overheads, and lower efficiency, thereby affecting communication quality of the voice service.

Figure 3:
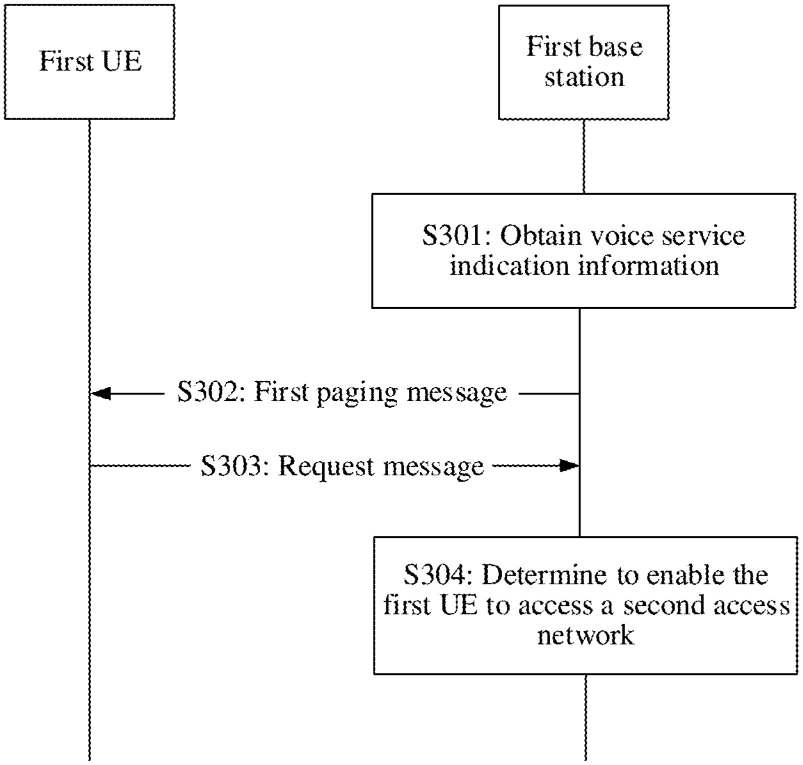
FIG. 3 is a schematic flowchart of a communication method according to at least one embodiment.

To reduce a delay of completing the EPS fallback by the UE in the non-connected state, at least one embodiment provides a communication method. The communication method is applied to the application scenario shown in FIG. 1. FIG. 3 is a schematic flowchart of a communication method according to at least one embodiment. The method includes the following steps.

S301: A first base station obtains voice service indication information.

The first base station is located in an access network (referred to as a "first access network" below) using a first radio access technology. For example, the first base station is located in an NR network, and the first base station is an NR base station, for example, a gNB.

The voice service indication information is also referred to as a voice service type indication, indicating a voice service.

S302: The first base station sends a first paging message to first UE, where the first paging message includes the voice service indication information.

The first base station initiates a paging process to one or more UEs in a non-connected state, and sends the first paging message to each UE, where the first UE is one UE that receives the first paging message. The non-connected state in at least one embodiment includes an idle state or a third state. The third state is also referred to as an inactive state (inactive state). Specifically, in the third state, an air interface connection between the UE and a serving base station is broken, but the UE retains various types of configuration information configured by the serving base station for the UE, the serving base station retains a context of the UE, and the serving base station retains a connection established between the serving base station and a core network for the UE. The serving base station is also referred to as an anchor (anchor) base station of the UE in the third state.

In response to the first UE being in the third state, the first base station is used as an anchor base station of the first UE. In addition, in response to the first UE being in the idle state, the first base station is used as a camped base station of the first UE. In at least one embodiment, both the anchor base station and the camped base station are referred to as serving base stations.

Optionally, the first paging message includes an information element (IE). The information element includes the voice service indication information. The information element is a newly designed information element or reuse an information element in an existing paging message. This is not specifically limited in at least one embodiment.

Optionally, the first paging message further includes identifiers of the one or more UEs, and an identifier of each UE corresponds to voice service indication information or a null value. In response to an identifier of one UE corresponding to voice service indication information, the UE is paged because a voice service arrives at the UE. In response to an identifier of one UE corresponding to a null value, the UE is paged because of a reason other than a voice service. The null value means that a bit that carries the voice service indication information does not appear, or is a preset value (for example, 0 or null).

Optionally, the first base station obtains the voice service indication information based on voice service related information from the core network. The core network and the first base station have a communication interface, and use a same radio access technology. For example, the first base station is a gNB, the core network is a 5GC, and the gNB communicates with the 5GC through an NG interface.

For example, in an implementation, the voice service related information is a paging message including the voice service indication information. Specifically, the first base station receives a second paging message from the core network, where the second paging message includes the voice service indication information. Therefore, the first base station learns that the core network prepares to initiate the voice service to the UE. Specifically, the second paging message includes an information element, and the information element includes the voice service indication information.

Optionally, the second paging message further includes identifiers of the one or more UEs, and an identifier of each UE corresponds to voice service indication information or a null value. To be specific, a correspondence between the voice service indication information and the identifier of the UE that are included in the second paging message is the same as a correspondence between the voice service indication information and the identifier of the UE that are included in the first paging message. The first base station includes, in the first paging message, identifiers of some or all UEs and corresponding voice service indication information in the received second paging message. The second paging message further includes an identifier of another UE, that is, the identifier of the UE included in the first paging message is an identifier of some UEs in the second paging message. The first base station pages, by using the first paging message, some UEs indicated by the core network by using the second paging message, and page, by using one or more other paging messages, other UEs indicated by the core network by using the second paging message.

The voice service indication information in the first paging message and the voice service indication information in the second paging message have different representation manners, for example, are included in different information elements, and/or use different quantities of bits. Any first paging message and any second paging message that each include indication information indicating that the UE is paged based on the voice service fall within the protection scope of at least one embodiment.

For another example, in an implementation, the voice service related information is downlink data related to the voice service. Specifically, the first base station receives, from the core network, downlink data transmitted to the terminal, where the downlink data is related to the voice service; and determines the voice service indication information based on the downlink data.

Specifically, in response to the first UE being in the third state, the first base station is an anchor base station of the first UE. In this scenario, the core network does not send the second paging message to the first base station, but directly sends the downlink data to the first UE via the first base station. In this case, the first base station determines whether the downlink data is related to the voice service. In response to the first base station determining that the downlink data is related to the voice service, the first base station generates a paging message (that is, the first paging message) that carries the voice service indication information, and send the paging message to the first UE.

For another example, in an implementation, the voice service related information is signaling related to the voice service. Specifically, the first base station receives, from the core network, signaling related to the terminal, where the signaling is related to the voice service; and determines the voice service indication information based on the signaling. For example, the core network sends the signaling to the first base station, to request to establish a QoS flow of the voice service of the first UE, or to request to establish or modify a PDU session of the voice service.

In this implementation, the first base station further sends the second paging message to a neighboring base station located in a same location area, where the second paging message includes the voice service indication information. The location area is a radio access network based notification area (RAN based notification area).

S303: The first UE sends a request message to the first base station based on the first paging message, where the request message is used to request to establish or resume an RRC connection, the request message includes indication information, and the indication information indicates that the RRC connection is established or resumed based on the voice service.

The voice service is indicated by the voice service indication information.

The first UE is one of the one or more UEs that receive the first paging message. After receiving the first paging message, the first UE determines whether the first paging message includes an identifier of the first UE. In response to the first UE determines that the first paging message includes the identifier of the first UE, that is, one UE identifier in the first paging message matches the identifier of the first UE, the first UE determines that the first UE is paged or called, and the first UE determines that the first UE is to enter an RRC connected state, to perform a paged service. In addition, in response to the voice service indication information included in the first paging message corresponding to the identifier of the first UE, the first UE determines that the paged service is the voice service.

Optionally, in response to the first UE being in the idle state, the first UE sends an RRC connection establishment request message to the first base station, where the RRC connection establishment request message includes the indication information.

Optionally, in response to the first UE being in the third state, the first UE sends an RRC connection resume request message to the first base station, where the RRC connection resume request message includes the indication information.

In an implementation, the indication information is an RRC connection establishment/resume cause value in the RRC connection establishment/resume request message. The RRC connection establishment/resume cause value indicates a cause of RRC connection establishment/resume initiated by the UE, and different RRC connection establishment/resume causes are represented in different manners. For example, "mt-access" indicates that the RRC connection establishment/resume cause is that the UE is called, and "mo-VoiceCall" indicates that the RRC connection establishment/resume cause is that the UE is to perform the voice service.

After an access stratum (AS) of the UE in the third state receives the first paging message, in response to the UE identifier included in the first paging message matching the identifier of the first UE that is provided by a non-access stratum (NAS), the AS notifies the NAS, and the NAS provides the RRC connection establishment/resume cause value. Therefore, the first UE includes the cause value in the RRC connection establishment/resume request message. However, in at least one embodiment, the AS ignores the cause value provided by the NAS, and replaces the cause value with the foregoing indication information.

S304: The first base station determines, based on the indication information in the request message, to enable the first UE to access an access network (referred to as a "second access network" below) using a second radio access technology, where the second access network supports the first terminal in performing the voice service.

The second access network and the first access network use different radio access technologies, that is, RATs. In response to the first base station being an NR base station, the second access network is an LTE network, and the first UE performs the voice service in the LTE network.

"Accessing a second access network" is accessing a base station in the second access network, or accessing a cell managed by a base station in the second access network. A base station to be accessed by the UE is referred to as a target base station, and a cell to be accessed by the UE is referred to as a target cell.

Specifically, the first base station determines, based on the indication information, that the first UE is to perform the voice service. In response to a capability of the first base station not being suitable for the UE to perform the voice service, for example, the first base station does not support the voice service, and another network factor such as a network deployment status is considered, the first base station determines to hand over or redirect the first UE to the target base station in the second access network.

To implement handover or redirection of the first UE, in an implementation, the first base station determines, based on the indication information, that the UE is to perform the voice service, to configure a measurement parameter for the first UE, where the measurement parameter is used by the first UE to measure a cell managed by one or more base stations in the second access network. After the first UE completes core network registration (as shown in step S203), the first base station sends the measurement parameter to the first UE without waiting for the core network to send the QoS flow establishment request to the first base station (as shown in step S201). Correspondingly, the first base station does not send a response message for the request to the core network (as shown in step S202). The first UE measures signal quality of each cell based on the measurement parameter, and determines a target base station based on a measurement result, or sends a measurement result to the first base station, and the first base station determines the target base station, so that the UE completes handover or redirection to the target base station. Because the first base station performs measurement configuration for the first UE in advance, a delay of accessing the target base station by the first UE is reduced, and communication quality of performing the voice service by the first UE is improved.

In another implementation, the first base station determines, based on the indication information, that the first UE is to perform the voice service, to determine, for the first UE, a target base station/cell or a frequency that is accessed in the second access network, and notify the first UE. For example, the first base station sends, to the first UE, indication information indicating the target base station/cell or the frequency that is accessed, so that the first UE completes handover or redirection to the target base station. In response to the first base station directly determining, for the first UE, the target base station/cell or the frequency that is accessed, a delay of accessing the target base station by the first UE is reduced, and communication quality of performing the voice service by the first UE is improved.

Figure 4:
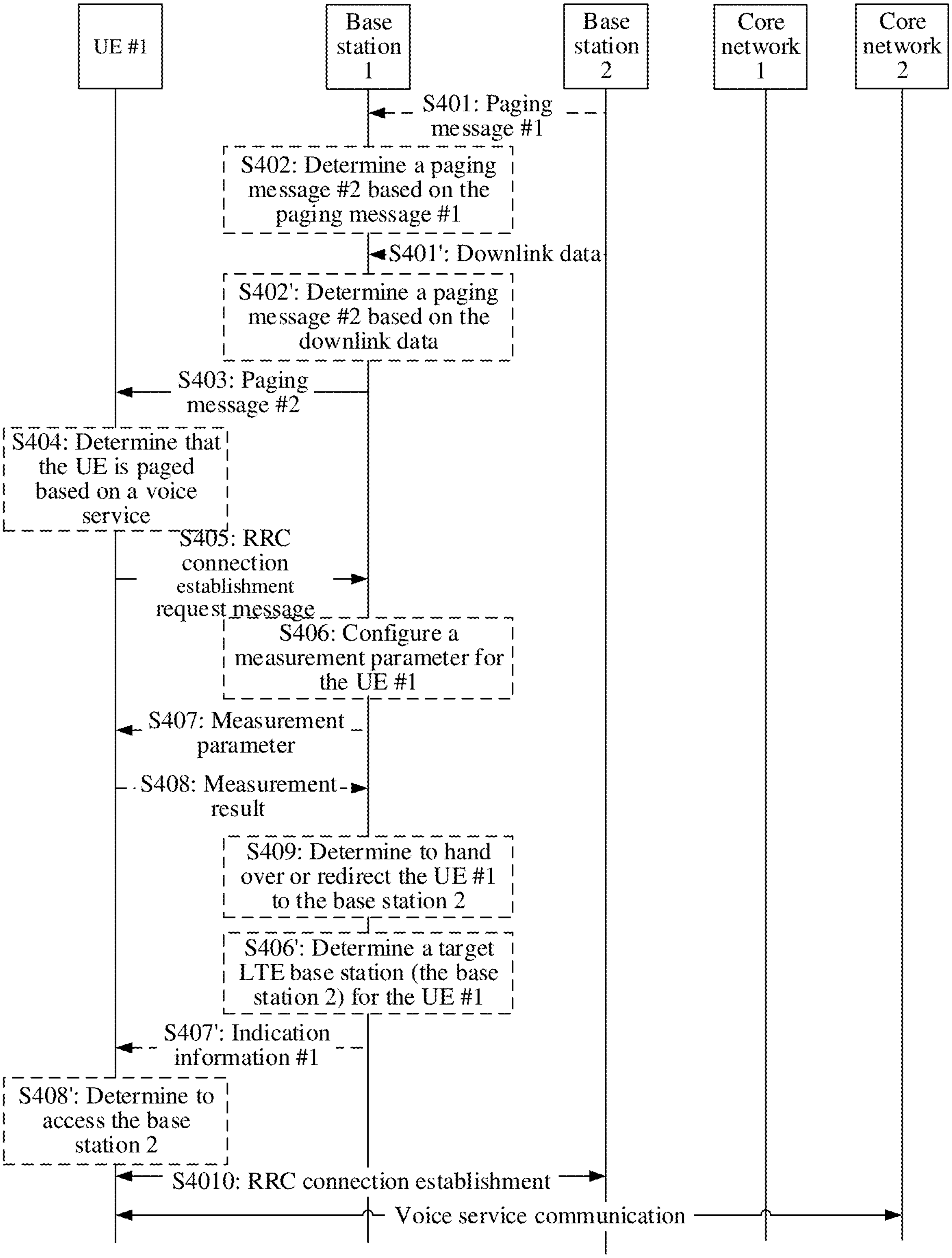
FIG. 4 is a schematic signaling flowchart of a communication method according to at least one embodiment.

In the embodiment shown in FIG. 4, the communication method provided in at least one embodiment is further described based on the embodiment shown in FIG. 3. Content described in the embodiment shown in FIG. 3 is not described again. In the embodiment shown in FIG. 4, the first base station is a base station 1, the second base station is a base station 2, and the first UE is UE #1. In response to the embodiment shown in FIG. 4 being applied to the application scenario shown in FIG. 1, the base station 1 is an NR base station, the core network 1 is a 5GC, the base station 2 is an LTE base station, and the core network 2 is an EPC. As shown in FIG. 4, the method includes the following steps.

S401: The core network 1 sends a paging message #1 to the base station 1.

The paging message #1 includes identifiers of one or more UEs, and identifiers of some or all UEs respectively correspond to voice service indication information. For example, an identifier of the UE #1 corresponds to voice service indication information, and the voice service indication information indicates that a reason why the UE #1 is paged is that a voice service arrives.

S402: The base station 1 determines a paging message #2 based on the paging message #1.

The paging message #2 includes identifiers of one or more UEs and voice service indication information corresponding to identifiers of some or all UEs.

For descriptions of the paging message #1 and the paging message #2, refer to the descriptions of the first paging message and the second paging message in the embodiment in FIG. 3.

In response to the paged UE, for example, the UE #1, being in a third state, in another implementation, S401 and S402 are replaced with S401' and S402'. S401' includes: The core network 1 sends, to the base station 1, downlink data transmitted to the UE #1.

S402' includes: The base station 1 determines that the downlink data is related to a voice service, and generates a paging message #2.

S403: The base station 1 sends the paging message #2 to the one or more UEs.

The UE #1 in an idle state receives the paging message #2.

S404: The UE #1 determines, based on the paging message #2, that the UE #1 is paged based on the voice service.

S405: In response to the UE #1 being in the idle state, the UE #1 sends an RRC connection establishment request message to the base station 1, where an RRC connection establishment cause value included in the RRC connection establishment request message is the voice service.

In response to the UE #1 being in the third state, the RRC connection establishment request message is replaced with an RRC connection resume request message.

For detailed descriptions of S404 and S405, refer to the foregoing content of S303. Details are not described again.

S406: The base station 1 configures a measurement parameter for the UE #1 based on the RRC connection establishment request message.

Specifically, in response to the base station 1 determining, based on the RRC connection establishment cause value, that the UE #1 is to perform the voice service, but a capability of the base station 1 does not support the UE #1 in performing the voice service, the base station 1 determines that EPS fallback is to be triggered for the UE #1, and enables the UE #1 to access an LTE cell. In this case, the LTE cell provides voice service communication for the UE #1.

S407: The base station 1 sends the configured measurement parameter to the UE #1.

S408: The UE #1 performs neighboring cell measurement based on the measurement parameter, and reports a measurement result to the base station #1.

S409: The base station 1 determines, based on the measurement result, to hand over or redirect the UE #1 to the base station 2.

S4010: The UE #1 and the base station 2 complete an RRC connection establishment process.

After accessing the base station 2, the UE #1 performs voice service communication with the core network 2 via the base station 2.

Optionally, $406 to S409 are replaced with S406' to S408'.

S406': The base station 1 determines, based on the RRC connection establishment request message, a to-be-accessed target LTE base station for the UE #1, for example, the base station 2.

Optionally, the base station 1 determines a to-be-accessed LTE cell or an available frequency for the UE #1.

S407': The base station 1 sends, to the UE #1, indication information #1 indicating the target LTE base station.

S408': The UE #1 determines, based on the indication information #1, to access the base station 2.

For detailed descriptions of S406 to S409 and S406' to S408', refer to related content of S304.

According to the communication methods provided in the embodiments in FIG. 3 and FIG. 4, the UE sends, to the serving base station, the RRC connection establishment/resume request message including a voice service cause value, so that the serving base station learns that the UE is to perform the voice service. In response to the base station not supporting the voice service, the base station determines to enable the UE to access another target access network that supports the voice service, and perform measurement configuration for the UE or determine a candidate base station/cell/frequency in the target access network for the UE, and the base station sends the measurement configuration to the UE or indicate the UE to access the target access network without waiting for the QoS flow establishment request sent by the core network, so that the UE performs the voice service in the target access network in time, thereby reducing a delay of performing the voice service by the UE, and improving communication quality.

Figure 5:
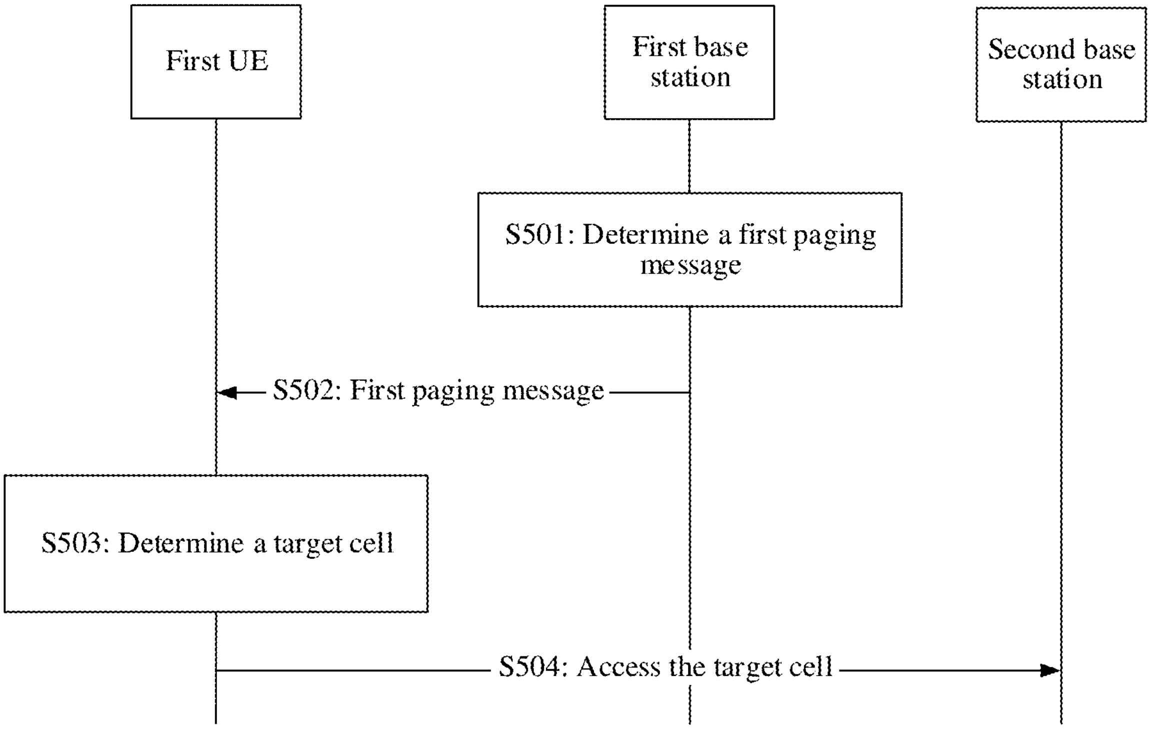
FIG. 5 is a schematic flowchart of a communication method according to at least one embodiment.

FIG. 5 is a schematic flowchart of another communication method according to at least one embodiment. The method includes the following steps.

S501: A first base station determines a first paging message, where the first paging message includes first indication information, and the first indication information indicates UE to access a second access network using a second radio access technology.

The first base station is located in a first access network using a first radio access technology. For example, the first base station is located in an NR network, and the first base station is a gNB.

The second access network and the first access network use different radio access technologies, that is, RATs. In response to the first base station being an NR base station, the second access network is an LTE network, and the first UE performs a voice service in the LTE network.

Optionally, the first base station determines, based on voice service related information from a core network, that the terminal is paged based on the voice service. In an implementation, the voice service related information is a second paging message including voice service indication information. In another implementation, the voice service related information is downlink data or signaling related to the voice service. For detailed descriptions of the voice service related information from the core network, refer to related content in the embodiments in FIG. 3 and FIG. 4.

Optionally, in response to the first base station learning that the first UE is paged based on the voice service, the first base station determines, based on whether the first base station supports the voice service and another network factor, for example, a network deployment status including whether a cell in the first access network and a target cell in the second access network have same coverage, a core network capability, or an operator policy, that the first UE falls back to the second access network, that is, enable the first UE to access the target base station in the second access network. Therefore, the first base station uses a paging message sent to the first UE to carry the first indication information.

In response to the first base station being an NR base station and the second access network being an LTE network, the first indication information is referred to as an EPS fallback indication, indicating the first UE to access an LTE cell to perform voice service paging.

S503: The first base station sends the first paging message to the first UE.

In an implementation, the first indication information is an explicit indication, that is, the first UE is directly indicated to access the second access network to perform the voice service. Optionally, the first paging message further includes voice service indication information. For detailed descriptions of the voice service indication information, refer to related content in the embodiments in FIG. 3 and FIG. 4.

In another implementation, the first indication information is an implicit indication. For example, the first indication information is the voice service indication information. The method further includes: The first UE receives third indication information from the first base station, where the third indication information includes any one or more of the following content: an explicit indication indicating the first UE to access the second access network, an indication indicating that the first access network does not support the voice service, information about a frequency/cell in the second access network in which the first base station recommends the first UE to perform the voice service, or the like. The third indication information is included in system information broadcast by the first base station. Therefore, the first UE determines, based on the voice service indication information carried in the second paging message and the third indication information included in the system information of a currently camped cell, that the first base station indicates the first UE to access the second access network to perform the voice service.

Optionally, the first paging message further includes identifiers of one or more UEs, and an identifier of the first UE corresponds to the first indication information. In response to the first indication information being the voice service indication information, for a design of an information element in the first paging message, refer to related content of the first paging message in the embodiment shown in FIG. 3.

S504: The first UE determines the target cell in the second access network based on the first indication information.

Specifically, the first UE determines, based on whether the second paging message carries the identifier of the first UE, whether the first UE is paged, and determines, based on the first indication information, that the first base station indicates the first UE to fall back to the second access network to perform the voice service. Therefore, the first UE selects the target cell in the second access network based on a condition such as a cell measurement result, and initiate an RRC connection establishment procedure to a base station (that is, the target base station, referred to as a second base station in at least one embodiment) to which the target cell belongs. The first UE is able to not access the first base station and then handed over or redirected from the first base station to the target base station, thereby reducing a delay of performing the voice service.

S505: The first UE accesses the target cell.

Specifically, the first UE sends an RRC connection establishment request message to the second base station. Optionally, the RRC connection establishment request message includes second indication information, and the second indication information indicates that an RRC connection is established based on the voice service. A function of the second indication information is similar to that of the indication information in the RRC connection establishment/resume request message in the embodiments shown in FIG. 3 and FIG. 4. Details are not described again.

Optionally, an access stratum of the first UE ignores an RRC connection establishment cause value provided by a non-access stratum. For detailed descriptions, refer to the embodiment shown in FIG. 3, for example, related content in step S304.

Optionally, in an implementation, in response to the first UE not being able to select a proper target cell or the first UE fails to access the target cell, the first UE sends an RRC connection resume request (RRC connection resume request) to the first base station, where the RRC connection resume request message includes the voice service indication information. In this case, the first base station processes the first UE based on the RRC connection resume request, for example, determine another target cell in the second access network for the first UE for access.

Optionally, in an implementation, the method further includes: The first base station sends information about a candidate frequency or cell to the first UE, where the candidate frequency or cell is a frequency or cell in the second access network, and the candidate frequency or cell belongs to a same candidate target base station, or belongs to different candidate target base stations. The first UE selects a finally accessed target cell from the candidate frequency or cell.

Optionally, the information about the candidate frequency or cell is included in system information broadcast by the first base station. Optionally, in response to the first base station switching the first UE from a connected state to a third state, an RRC release message sent by the first base station to the first UE includes the information about the candidate frequency or cell.

Figure 6:
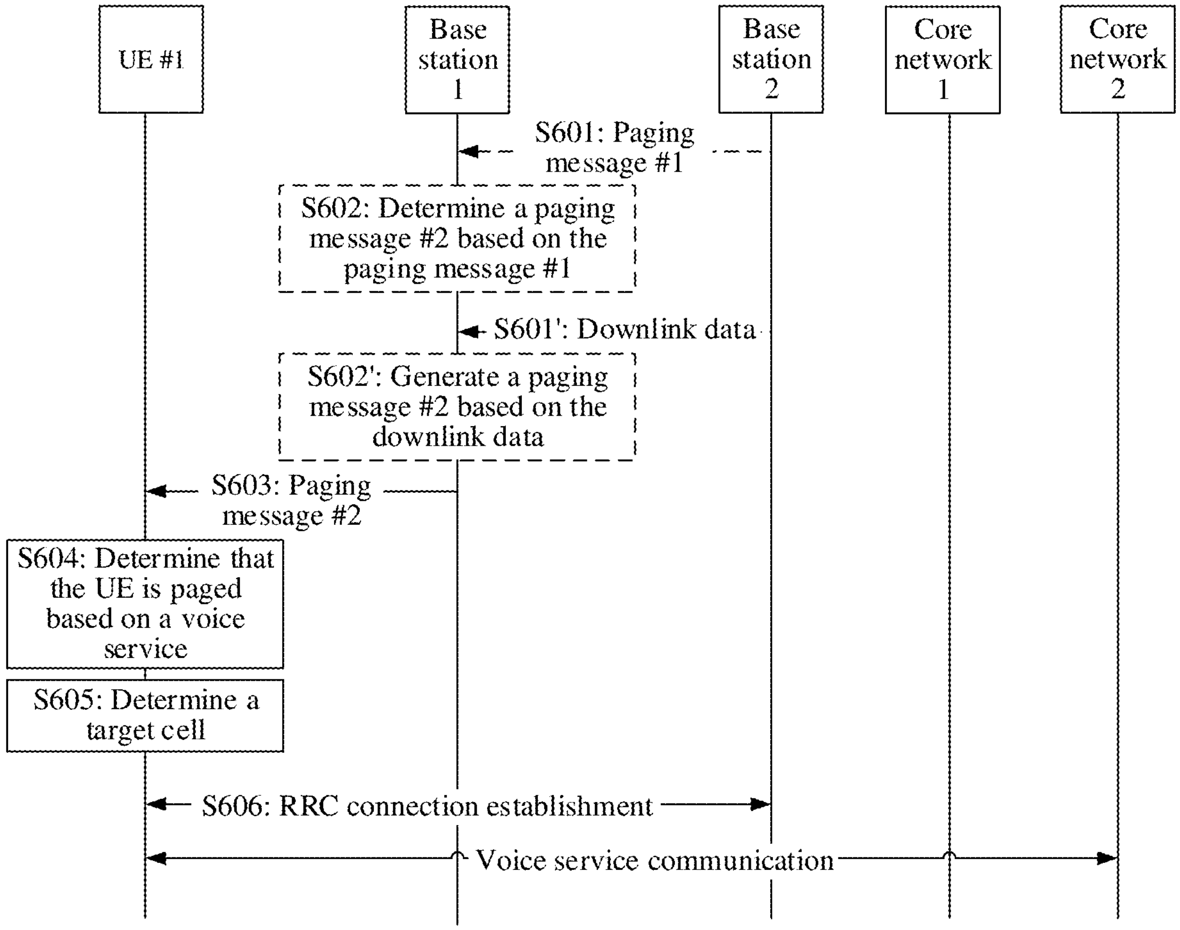
FIG. 6 is a schematic signaling flowchart of a communication method according to at least one embodiment.

In the embodiment shown in FIG. 6, the communication method provided in at least one embodiment is further described based on the embodiment shown in FIG. 5. Content described in the foregoing embodiment is not described again. In the embodiment shown in FIG. 6, the first base station is a base station 1, the second base station is a base station 2, and the first UE is UE #1. In response to the embodiment shown in FIG. 6 being applied to the application scenario shown in FIG. 1, the base station 1 is an NR base station, the core network 1 is a 5GC, the base station 2 is an LTE base station, and the core network 2 is an EPC. As shown in FIG. 6, the method includes the following steps.

S601: The core network 1 sends a paging message #1 to the base station 1.

The paging message #1 includes identifiers of one or more UEs, and identifiers of some or all UEs respectively correspond to voice service indication information. For example, an identifier of the UE #1 corresponds to voice service indication information, and the voice service indication information indicates that a reason why the UE #1 is paged is that a voice service arrives.

S602: The base station 1 determines a paging message #2 based on the paging message #1. The paging message #2 includes identifiers of one or more UEs and voice service indication information corresponding to identifiers of some or all UEs.

For descriptions of the paging message #1 and the paging message #2, refer to the descriptions of the first paging message and the second paging message in the embodiment in FIG. 5. In response to paged UE, for example, the UE #1, being in a third state, in another implementation, S601 and S602 are replaced with S601' and S602'.

S601': The core network 1 sends, to the base station 1, downlink data transmitted to the UE #1.

S602': The base station 1 determines that the downlink data is related to a voice service, and generates a paging message #2.

For detailed descriptions of S601 and S602 and S601' and S602', refer to related content in the embodiments in FIG. 3 and FIG. 4.

S603: The base station 1 sends the paging message #2 to the one or more UEs.

The UE #1 in an idle state receives the paging message #2.

S604: The UE #1 determines, based on the paging message #2, that the UE #1 is paged based on the voice service.

S605: The UE #1 determines a target cell, where the target cell is managed by the base station 2.

S606: The UE #1 and the base station 2 complete an RRC connection establishment process.

Optionally, that the UE #1 and the base station 2 complete an RRC connection establishment process includes: The UE #1 sends an RRC connection establishment request message to the base station 2. Optionally, the RRC connection establishment request message includes an RRC connection establishment cause value indicating the voice service.

After accessing the base station 2, the UE #1 performs voice service communication with the core network 2 via the base station 2.

According to the communication methods shown in FIG. 5 and FIG. 6 in at least one embodiment, after receiving, from a currently camped base station, a paging message including the voice service indication information, the UE learns that the camped base station indicates the UE to access a target access network that supports the UE to perform the voice service. Therefore, the UE directly initiates an access process to a base station in the target access network without accessing the camped base station or registering with the core network connected to the camped base station, so that the UE performs the voice service in the target access network in time, thereby reducing a delay of performing the voice service by the UE, and improving communication quality.

Figure 7:
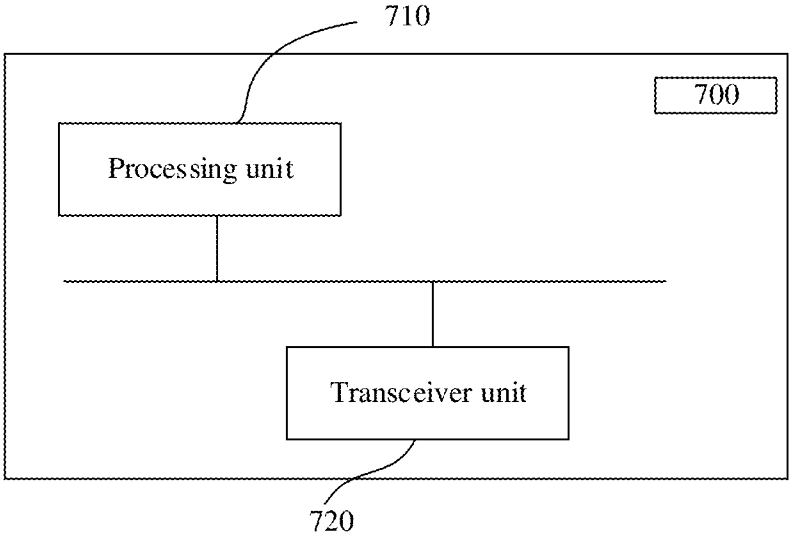
FIG. 7 is a diagram of a communication apparatus 700 according to at least one embodiment.

At least one embodiment further provides a communication apparatus configured to implement any one of the foregoing methods. For example, the communication apparatus includes units (or means) configured to implement steps performed by the terminal or the access network device in any one of the foregoing methods. For example, FIG. 7 is a diagram of a communication apparatus according to at least one embodiment. The communication apparatus is a module used in a terminal or an access network device, for example, a chip: or the communication apparatus is a terminal or an access network device. As shown in FIG. 7, the communication apparatus 700 includes a processing unit 710 and a transceiver unit 720.

In an implementation, in response to the communication apparatus being used in the access network device, the access network device is used as a camped base station of a terminal in a non-connected state. The processing unit 710 is configured to obtain voice service indication information. The transceiver unit 720 is configured to: send a first paging message to a first terminal, where the first paging message includes the voice service indication information, and the access network device is located in a first access network using a first radio access technology; and receive a request message from the first terminal, where the request message is used to request to establish or resume an RRC connection, the request message includes indication information, and the indication information indicates that the RRC connection is established or resumed based on a voice service. The processing unit 710 is further configured to determine, based on the indication information, to enable the first terminal to access a second access network using a second radio access technology, where the second access network supports the first terminal in performing the voice service.

Optionally, the first paging message further includes an identifier of one or more terminals, an identifier of the first terminal corresponds to the voice service indication information, and the first terminal belongs to the one or more terminals.

Optionally, the processing unit 710 is configured to determine, based on the indication information, to hand over or redirect the first terminal to a second access network device, where the second access network device is located in the second access network.

Optionally, the processing unit 710 is adapted to configure a measurement parameter for the first terminal based on the indication information, where the measurement parameter is used to measure a cell managed by one or more access network devices in the second access network.

Optionally, the processing unit 710 is configured to determine a target base station or a target cell in the second access network for the first terminal based on the indication information. The transceiver unit 720 is further configured to indicate the target base station or the target cell to the first terminal.

Optionally, the processing unit 710 receives a second paging message from a core network via the transceiver unit 720, where the second paging message includes the voice service indication information.

Optionally, the processing unit 710 receives, via the transceiver unit 720, downlink data transmitted to the first terminal or signaling related to the first terminal, where the downlink data or the signaling is related to the voice service; and determines the voice service indication information based on the downlink data or the signaling.

The core network and the access network device use a same radio access technology.

In an implementation, in response to the communication apparatus being used in the terminal, the transceiver unit 720 is configured to: receive a first paging message from a first access network device, where the first paging message includes voice service indication information, and the first access network device is located in a first access network using a first radio access technology; and send a request message to the first access network device, where the request message is used to request to establish or resume an RRC connection, the request message includes indication information, and the indication information indicates that the RRC connection is established or resumed based on a voice service.

Optionally, the processing unit 710 is configured to perform a function of an access stratum of the terminal, and the processing unit 710 ignores an RRC connection establishment cause value or an RRC connection resume cause value provided by a non-access stratum of the terminal.

Optionally, the transceiver unit 720 is configured to receive a measurement parameter from the first access network device, where the measurement parameter is used to measure a cell managed by one or more access network devices in a second access network.

Optionally, the transceiver unit 720 is configured to receive, from the first access network device, indication information indicating a target base station or a target cell located in the second access network.

For more detailed descriptions of functions performed by the units of the communication apparatuses on the access network device side and the terminal side in the foregoing implementations, refer to the descriptions of the steps performed by the first base station or the first UE in the method embodiments in FIG. 3 and FIG. 4.

In an implementation, in response to the communication apparatus being used in the access network device, the processing unit 710 is configured to determine a first paging message, where the first paging message includes first indication information, and the first indication information indicates a first terminal to access a second access network; and the transceiver unit 720 is configured to send the first paging message to the first terminal, where the first paging message is used by the first terminal to determine to access a target cell in the second access network, where the access network device is located in a first access network using a first radio access technology, the second access network uses a second radio access technology, and the second access network supports the first terminal in performing a voice service.

Optionally, the processing unit 710 is configured to: receive a second paging message from a core network via the transceiver unit 720, where the second paging message includes voice service indication information; and determine the first paging message based on the second paging message, where the core network and the access network device use a same radio access technology.

Optionally, the processing unit 710 is configured to: receive downlink data or signaling from a core network via the transceiver unit 720, where the downlink data is transmitted to the first terminal, the signaling is related to the first terminal, and the downlink data or the signaling is related to the voice service; and determine the first paging message based on the downlink data or the signaling.

Optionally, the transceiver unit 720 is further configured to send information about a candidate frequency or information about a candidate cell to the first terminal.

Optionally, the first indication information is the voice service indication information, or the first paging message further includes the voice service indication information.

In an implementation, in response to the communication apparatus being used in the terminal, the transceiver unit 720 is configured to receive a first paging message from a first access network device, where the first paging message includes first indication information, and the first indication information indicates the first terminal to access a second access network; and the processing unit 710 is configured to determine a target cell in the second access network based on the first indication information; and access the target cell in the second access network, where the first access network device is located in a first access network using a first radio access technology, the second access network uses a second radio access technology, and the second access network supports the terminal in performing a voice service.

Optionally, the processing unit 710 sends, via the transceiver unit 720, an RRC connection establishment request message to a second access network device to which the target cell belongs. Optionally, the RRC connection establishment request message includes second indication information, and the second indication information indicates that an RRC connection is established based on the voice service.

Optionally, the transceiver unit 720 is configured to receive information about a candidate frequency or information about a candidate cell from the first access network device.

For more detailed descriptions of functions performed by the units of the communication apparatuses on the access network device side and the terminal side in the foregoing implementations, refer to the descriptions of the steps performed by the first base station or the first UE in the method embodiments in FIG. 5 and FIG. 6.

Division into units in the apparatus is merely logical function division. In an actual implementation, all or some of the units are integrated into one physical entity or are physically separated. For example, the transceiver unit 720 is divided into a receiving unit and a sending unit. In response to the communication apparatus 700 being a communication apparatus on an access network side, the transceiver unit 720 is further divided into a first transceiver unit communicating with the terminal and a second transceiver unit communicating with another network device such as a base station or a core network device.

All the units in the apparatus are implemented in a form of software invoked by a processing element, or are implemented in a form of hardware: or some units are implemented in a form of software invoked by a processing element, and some units are implemented in a form of hardware. For example, each unit is a separately disposed processing element, or is integrated into a chip of the apparatus for implementation. In addition, each unit is alternatively stored in a memory in a form of a program to be invoked by a processing element of the apparatus to perform a function of the unit. In addition, all or some of these units are integrated, or are implemented independently. The processing element herein is also referred to as a processor, and is an integrated circuit having a signal processing capability. In an implementation process, steps in the foregoing methods or the foregoing units are implemented by using a hardware integrated logic circuit in a processor element, or are implemented in a form of software invoked by the processing element.

In an example, a unit in any one of the foregoing apparatuses is one or more integrated circuits configured to implement the foregoing method, for example, one or more application-specific integrated circuits (ASIC), one or more microprocessors (DSP), or one or more field programmable gate arrays (FPGA), or a combination of at least two of these integrated circuit forms. For another example, in response to the units in the apparatus being implemented in a form of scheduling a program by a processing element, the processing element is a general-purpose processor, for example, a central processing unit (CPU) or another processor that invokes the program. For another example, the units are integrated together and implemented in a form of a system-on-a-chip (SoC).

The foregoing unit for receiving (for example, a communication unit) is an interface circuit of the apparatus, and is configured to receive a signal from another apparatus. For example, in response to the apparatus being implemented in a manner of a chip, the receiving unit is an interface circuit that is of the chip and that is configured to receive a signal from another chip or apparatus. The foregoing unit for sending (for example, a sending unit or a communication unit) is an interface circuit of the apparatus, and is configured to send a signal to another apparatus. For example, in response to the apparatus being implemented in a manner of a chip, the sending unit is an interface circuit that is of the chip and that is configured to send a signal to another chip or apparatus.

In another implementation, the communication apparatus provided in at least one embodiment includes at least one processing element and an interface circuit. The at least one processing element is configured to perform any communication method provided in the foregoing method embodiments. The processing element performs, in a first manner, that is, by invoking a program stored in a storage element, some or all of the steps performed by the terminal or the network device: or performs, in a second manner, that is, by using a hardware integrated logic circuit in a processor element in combination with instructions, some or all of the steps performed by the terminal or the network device: or certainly performs, by combining the first manner and the second manner, some or all of the steps performed by the terminal or the network device. The interface circuit is understood to be a transceiver or an input/output interface. Optionally, the communication apparatus further includes a memory, configured to: store instructions executed by the foregoing processing element, or store input data used by the processing element to run instructions, or store data generated after the processing element runs instructions.

As described above, the processing element herein is a general-purpose processor, for example, a CPU, or is one or more integrated circuits configured to implement the foregoing methods, for example, one or more ASICs, one or more microprocessors DSPs, one or more FPGAs, or a combination of at least two of the integrated circuits. The storage element is one memory, or is a general term of a plurality of storage elements.

Figure 8:
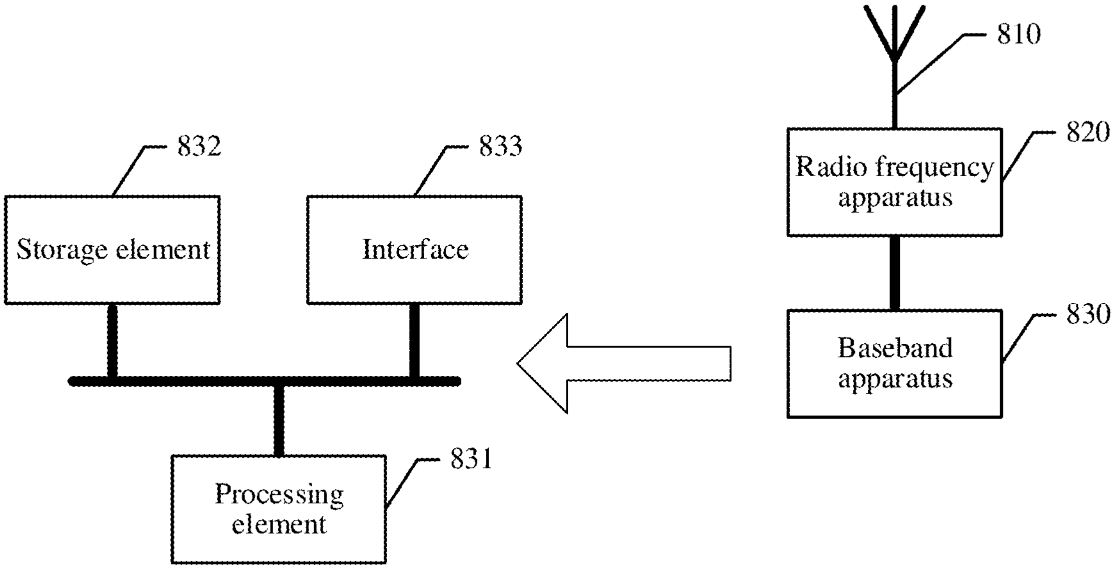
FIG. 8 is a diagram of a network device 800 according to at least one embodiment.

FIG. 8 is a diagram of a structure of a network device according to at least one embodiment. The network device is an access network device such as a base station, and is configured to perform the communication method provided in the foregoing method embodiment. As shown in FIG. 8, the network device includes an antenna 88, a radio frequency apparatus 820, and a baseband apparatus 830. The antenna 88 is connected to the radio frequency apparatus 820. In an uplink direction, the radio frequency apparatus 820 receives, via the antenna 88, information sent by a terminal, and sends, to the baseband apparatus 830 for processing, the information sent by the terminal. In a downlink direction, the baseband apparatus 830 processes information of the terminal, and sends the processed information to the radio frequency apparatus 820. The radio frequency apparatus 820 processes the information of the terminal, and then sends the processed information to the terminal via the antenna 88.

The baseband apparatus 830 includes one or more processing elements 831, for example, include a main control CPU and another integrated circuit. In addition, the baseband apparatus 830 further includes a storage element 832 and an interface 833. The storage element 832 is configured to store a program and data. The interface 833 is configured to exchange information with the radio frequency apparatus 820. The interface is, for example, a common public radio interface (CPRI). The foregoing apparatus used in the network device is located in the baseband apparatus 830. For example, the foregoing apparatus used in the network device is a chip on the baseband apparatus 830. The chip includes at least one processing element and an interface circuit. The processing element is configured to perform steps performed by the first base station or the second base station in any communication method provided in the foregoing method embodiments. The interface circuit is configured to communicate with another apparatus. In an implementation, the units that implement the steps in the foregoing methods in the network device are implemented in a form of scheduling a program by a processing element. For example, the apparatus used in the network device includes a processing element and a storage element, and the processing element invokes the program stored in the storage element, to perform the communication method provided in any one of the foregoing method embodiments. The storage element is a storage element on a same chip as the processing element, that is, an on-chip storage element, or is a storage element on a different chip from the processing element, that is, an off-chip storage element.

Figure 9:
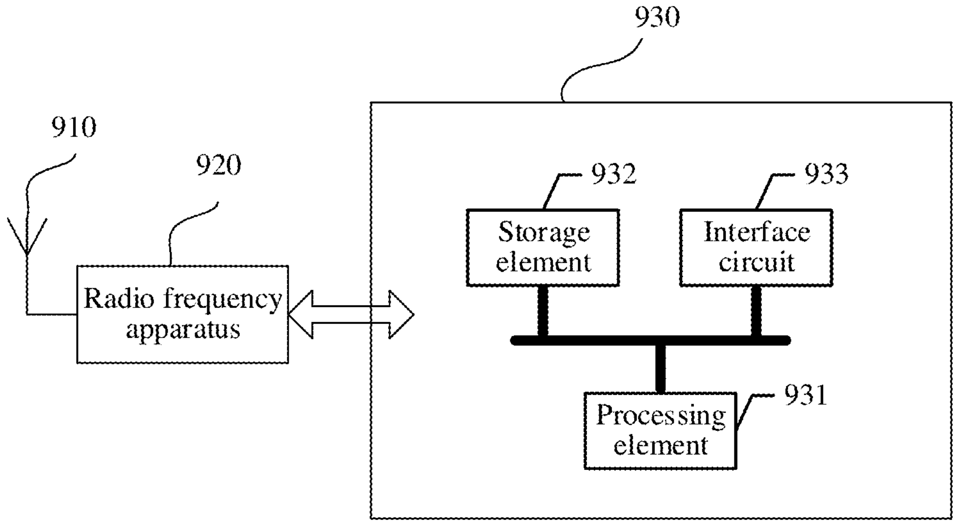
FIG. 9 is a diagram of a terminal 900 according to at least one embodiment.

FIG. 9 is a diagram of a structure of a terminal according to at least one embodiment. The terminal is configured to implement the communication method provided in the foregoing method embodiment. As shown in FIG. 9, the terminal includes an antenna 910, a radio frequency part 920, and a signal processing part 930. The antenna 910 is connected to the radio frequency part 920. In a downlink direction, the radio frequency part 920 receives, via the antenna 910, information sent by a network device, and sends, to the signal processing part 930 for processing, the information sent by the network device. In an uplink direction, the signal processing part 930 processes information of the terminal, and sends the processed information to the radio frequency part 920. The radio frequency part 920 processes the information of the terminal, and then sends the processed information to the network device via the antenna 910.

The signal processing part 930 is configured to process each communication protocol layer of data. The signal processing part 930 is a subsystem of the terminal. In this case, the terminal further includes another subsystem, for example, a central processing subsystem, configured to process an operating system and an application layer of the terminal. For another example, a peripheral subsystem is configured to be connected to another device. The signal processing part 930 is a separately disposed chip. Optionally, the foregoing apparatus is located in the signal processing part 930.

The signal processing part 930 includes one or more processing elements 931, for example, include a main control CPU and another integrated circuit. In addition, the signal processing part 930 further includes a storage element 932 and an interface circuit 933. The storage element 932 is configured to store data and a program. The program used to perform the foregoing methods performed by the terminal in the methods is stored or is not stored in the storage element 932, for example, stored in a memory outside the signal processing part 930. During use, the signal processing part 930 loads the program into a cache for use. The interface circuit 933 is configured to communicate with an apparatus. The foregoing apparatus is located in the signal processing part 930. The signal processing part 930 is implemented by using a chip. The chip includes at least one processing element and an interface circuit. The processing element is configured to perform steps performed by the terminal in any communication method provided in the foregoing method embodiments. The interface circuit is configured to communicate with another apparatus. In an implementation, the units that implement the steps in the foregoing methods are implemented in a form of scheduling a program by a processing element. For example, the apparatus includes a processing element and a storage element, and the processing element invokes the program stored in the storage element, to perform any communication method provided in the foregoing method embodiments. The storage element is a storage element on a same chip as the processing element, that is, an on-chip storage element.

In another implementation, the program used to perform the foregoing methods performed by the terminal or the network device is in a storage element on a different chip from the processing element, that is, an off-chip storage element. In this case, the processing element invokes a program from the off-chip storage element or loads a program to the on-chip storage element, to invoke and perform any communication method in the foregoing method embodiments.

In still another implementation, the units that implement the steps in the foregoing methods in the terminal or the network device are configured as one or more processing elements. The processing element herein is an integrated circuit, for example, one or more ASICs, one or more DSPs, one or more FPGAs, or a combination of these types of integrated circuits. These integrated circuits are integrated together to form a chip.

The units that implement the steps in the foregoing methods are integrated together and implemented in a form of a system-on-a-chip (SoC). The SoC chip is configured to implement the foregoing methods. At least one processing element and a storage element are integrated into the chip, and the processing element invokes a program stored in the storage element to implement the foregoing methods performed by the terminal or the network device. Alternatively, at least one integrated circuit is integrated into the chip, to implement the foregoing methods performed by the terminal or the network device. Alternatively, with reference to the foregoing implementations, functions of some units are implemented by invoking a program by the processing element, and functions of some units are implemented by the integrated circuit.

At least one embodiment further provides a communication system, including a first access network device and a second access network device. The first access network device performs steps performed by the first base station in any communication method provided in the foregoing method embodiments, and the second access network device performs steps performed by the second base station in any communication method provided in the foregoing method embodiments.

A person of ordinary skill in the art understands that all or some of the steps of the method embodiments are implemented by a program instructing relevant hardware. The program is stored in a computer-readable storage medium. In response to the program running, the steps of the method embodiments are performed. The foregoing storage medium includes any medium that stores program code, such as a ROM, a RAM, a magnetic disk, or an optical disc.

The term "and/or" in at least one embodiment describes only an association relationship between associated objects and represents that three relationships exist. For example, A and/or B represent the following three cases: Only A exists, both A and B exist, and only B exists.

In at least one embodiment, "B corresponding to A" indicates that B is associated with A, and B is determined based on A. However, determining B based on A does not mean that B is determined based only on A. B is alternatively determined based on A and/or other information.

"A plurality of" in at least one embodiment refers to "two or more".

Descriptions such as "first" and "second" in at least one embodiment are merely used for illustration and distinguishing between described objects, are not sequenced, do not represent a special limitation on a quantity of described objects in at least one embodiment, and do not constitute any limitation on at least one embodiment.

Unless otherwise specified, "transmit/transmission" (transmit/transmission) in at least one embodiment refers to bidirectional transmission, and includes a sending action and/or a receiving action. Specifically, "transmit/transmission" in at least one embodiment includes data sending, data receiving, or data sending and data receiving. That is, data transmission herein includes uplink data transmission and/or downlink data transmission. Data includes information and/or a signal. Uplink data transmission is uplink information transmission and/or uplink signal transmission, and downlink data transmission is downlink information transmission and/or downlink signal transmission.

Mutual reference is made to content in at least one embodiment. Unless otherwise specified or a logical conflict occurs, terms and/or descriptions in different embodiments are consistent and are referenced by each other. Technical features in different embodiments are able to be combined to form a new embodiment based on an internal logical relationship thereof.

In at least one embodiment, the terminal and/or the network device performs some or all steps in embodiments described herein. These steps or operations are merely examples. In at least one embodiment, other operations or variations of various operations are further performed. In addition, the steps are performed in a sequence different from a sequence presented in at least one embodiment, and not all the operations in at least one embodiment are performed.

What is claimed is:

1. A communication method, comprising:

obtaining, by a first access network device, voice service indication information;

sending, by the first access network device, a first paging message to a first terminal, wherein the first paging message comprises the voice service indication information corresponding to an identifier of the first terminal, and the first access network device is located in a first access network using a first radio access technology;

receiving, by the first access network device, a request message from the first terminal based on the voice service indication information corresponding to the identifier of the first terminal, wherein the request message is used to request to establish or resume a radio resource control (RRC) connection, the request message comprises indication information, and the indication information includes a cause value that is used to indicate that the RRC connection is established or resumed based on a voice service; and determining, by the first access network device based on the indication information, a target base station in a second access network identified by the indication information to enable the first terminal to access the second access network using a second radio access technology, wherein the second access network supports the first terminal in performing the voice service.

2. The method according to claim 1, wherein the determining, by the first access network device based on the indication information, to enable the first terminal to access the second access network using the second radio access technology includes:

determining, by the first access network device based on the indication information, to hand over or redirect the first terminal to a second access network device, wherein the second access network device is located in the second access network.

3. The method according to claim 1, wherein the determining, by the first access network device based on the indication information, to enable the first terminal to access the second access network using the second radio access technology includes:

configuring, by the first access network device, a measurement parameter for the first terminal based on the indication information, wherein the measurement parameter is used to measure a cell managed by one or more access network devices in the second access network.

4. The method according to claim 1, wherein the obtaining, by the first access network device, the voice service indication information includes:

receiving, by the first access network device, a second paging message from a core network, wherein the second paging message comprises the voice service indication information, and the core network and the first access network device use a same radio access technology.

5. The method according to claim 1, wherein the obtaining, by the first access network device, the voice service indication information includes:

receiving, by the first access network device from a core network, downlink data transmitted to the first terminal or signaling related to the first terminal, wherein the downlink data or the signaling is related to the voice service; and determining, by the first access network device, the voice service indication information based on the downlink data or the signaling, wherein the core network and the first access network device use a same radio access technology.

6. The method according to claim 5, wherein the method further comprises:

sending, by the first access network device, a second paging message to a neighboring access network device, wherein the second paging message comprises the voice service indication information.

7. A data transmission apparatus, comprising:

one or more processors configured to execute instructions to cause the one or more processors to perform operations to:

obtain voice service indication information;

send a first paging message to a first terminal, wherein the first paging message comprises the voice service indication information corresponding to an identifier of the first terminal, and a first access network device is located in a first access network using a first radio access technology;

receive a request message from the first terminal based on the voice service indication information corresponding to the identifier of the first terminal, wherein the request message is used to request to establish or resume a radio resource control (RRC) connection, the request message comprises indication information, and the indication information includes a cause value that is used to indicate that the RRC connection is established or resumed based on a voice service; and determine, based on the indication information, a target base station in a second access network identified by the indication information to enable the first terminal to access the second access network using a second radio access technology, wherein the second access network supports the first terminal in performing the voice service.

8. The apparatus according to claim 7, wherein the one or more processors are further configured to determine, based on the indication information, to enable the first terminal to access the second access network using the second radio access technology by:

determining, based on the indication information, to hand over or redirect the first terminal to a second access network device, wherein the second access network device is located in the second access network.

9. The apparatus according to claim 7, wherein the one or more processors are further configured to determine, based on the indication information, to enable the first terminal to access the second access network using the second radio access technology by:

configuring a measurement parameter for the first terminal based on the indication information, wherein the measurement parameter is used to measure a cell managed by one or more access network devices in the second access network.

10. The apparatus according to claim 7, wherein the one or more processors are further configured to obtain the voice service indication information by:

receiving a second paging message from a core network, wherein the second paging message comprises the voice service indication information, and the core network and the first access network device use a same radio access technology.

11. The apparatus according to claim 7, wherein the one or more processors are further configured to obtain the voice service indication information by:

receiving, from a core network, downlink data transmitted to the first terminal or signaling related to the first terminal, wherein the downlink data or the signaling is related to the voice service; and determining the voice service indication information based on the downlink data or the signaling, wherein the core network and the first access network device use a same radio access technology.

12. The apparatus according to claim 11, wherein the one or more processors are further configured to:

send a second paging message to a neighboring access network device, wherein the second paging message comprises the voice service indication information.

13. A non-transitory computer readable medium storing instructions that are executable by a computer, the non-transitory computer readable medium is applied to a first communication apparatus, and the instructions comprise instructions for:

obtaining voice service indication information;

sending a first paging message to a first terminal, wherein the first paging message includes the voice service indication information corresponding to an identifier of the first terminal, and a first access network device is located in a first access network using a first radio access technology;

receiving a request message from the first terminal based on the voice service indication information corresponding to the identifier of the first terminal, wherein the request message is used to request to establish or resume a radio resource control (RRC) connection, the request message includes indication information, and the indication information includes a cause value that is used to indicate that the RRC connection is established or resumed based on a voice service; and determining, based on the indication information, a target base station in a second access network identified by the indication information to enable the first terminal to access the second access network using a second radio access technology, wherein the second access network supports the first terminal in performing the voice service.

14. The non-transitory computer readable medium according to claim 13, wherein the determining, based on the indication information, to enable the first terminal to access the second access network using the second radio access technology includes:

determining, based on the indication information, to hand over or redirect the first terminal to a second access network device, wherein the second access network device is located in the second access network.

15. The non-transitory computer readable medium according to claim 13, wherein the determining, based on the indication information, to enable the first terminal to access the second access network using the second radio access technology includes:

configuring a measurement parameter for the first terminal based on the indication information, wherein the measurement parameter is used to measure a cell managed by one or more access network devices in the second access network.

16. The non-transitory computer readable medium according to claim 13, wherein the obtaining the voice service indication information includes:

receiving a second paging message from a core network, wherein the second paging message comprises the voice service indication information, and the core network and the first access network device use a same radio access technology.

17. The non-transitory computer readable medium according to claim 13, wherein the obtaining the voice service indication information includes:

receiving, from a core network, downlink data transmitted to the first terminal or signaling related to the first terminal, wherein the downlink data or the signaling is related to the voice service; and determining the voice service indication information based on the downlink data or the signaling, wherein the core network and the first access network device use a same radio access technology.

18. The non-transitory computer readable medium according to claim 17, wherein the instructions further comprise instructions for:

sending a second paging message to a neighboring access network device, wherein the second paging message includes the voice service indication information.

* * * * *